US009823457B2

(12) United States Patent
Li et al.

(10) Patent No.: US 9,823,457 B2
(45) Date of Patent: Nov. 21, 2017

(54) MULTIPLANE OPTICAL MICROSCOPE (71) Applicants: Tongcang Li, West Lafayette, IN (US); Sadao Ota, Tokyo (JP); Jeongmin Kim, Berkeley, CA (US); Yuan Wang, Albany, CA (US); Xiang Zhang, Alamo, CA (US)

(72) Inventors: Tongcang Li, West Lafayette, IN (US); Sadao Ota, Tokyo (JP); Jeongmin Kim, Berkeley, CA (US); Yuan Wang, Albany, CA (US); Xiang Zhang, Alamo, CA (US)

(73) Assignee: The Regents of the University of California, Oakland, CA (US)

( * ) Notice: Subject to any disclaimer, the term of this patent is extended or adjusted under 35 U.S.C. 154(b) by 382 days.

(21) Appl. No.: 14/591,760

(22) Filed: Jan. 7, 2015

(65) Prior Publication Data
US 2015/0192767 A1 Jul. 9, 2015

Related U.S. Application Data (60) Provisional application No. 61/925,118, filed on Jan. 8, 2014, provisional application No. 61/944,692, filed on Feb. 26, 2014.

(51) Int. Cl.
| G02B 21/18 | (2006.01) |
| G02B 21/36 | (2006.01) |
| G02B 21/06 | (2006.01) |
| G02B 21/16 | (2006.01) |

(52) U.S. Cl.
CPC ............. *G02B 21/18* (2013.01); *G02B 21/06* (2013.01); *G02B 21/361* (2013.01); *G02B 21/367* (2013.01); *G02B 21/16* (2013.01)

(58) Field of Classification Search
CPC .... G02B 21/18; G02B 21/361; G02B 21/367; G02B 21/16; G02B 21/06
See application file for complete search history.

(56) References Cited

U.S. PATENT DOCUMENTS 8,582,203 B2 * 11/2013 Dunsby ................. G02B 21/16
                                                                  359/368
2014/0333750 A1 * 11/2014 Zhuang ................ G02B 21/367
                                                                   348/79

OTHER PUBLICATIONS

J. Kim, T. Li, Y. Wang and X. Zhang, "Vectorial point spread function and optical transfer function in oblique plane imaging," Opt. Express 22, 11140-11151 (2014).
T. Li, S. Ota, J. Kim, Z. J. Wong, Y. Wang, X. Yin, and X. Zhang, "Wide-field axial plane optical microscopy," in Frontiers in Optics 2014, OSA Technical Digest (online) (Optical Society of America, 2014).

(Continued)

*Primary Examiner* — Dave Czekaj
*Assistant Examiner* — Berteau Joisil
(74) *Attorney, Agent, or Firm* — Lawrence Berkeley National Laboratory (57) ABSTRACT

This disclosure provides systems, methods, and apparatus related to optical microscopy. In one aspect, an apparatus includes a sample holder, a first objective lens, a plurality of optical components, a second objective lens, and a mirror. The apparatus may directly image a cross-section of a sample oblique to or parallel to the optical axis of the first objective lens, without scanning.

20 Claims, 8 Drawing Sheets

(56) References Cited

OTHER PUBLICATIONS

F. Anselmi, C. Ventalon, A. Bègue, D. Ogden, and V. Emiliani, "Three-dimensional imaging and photostimulation by remote-focusing and holographic light patterning," Proc. Natl. Acad. Sci. U.S.A. 108(49), 19504-19509 (2011).

C. W. Smith, E. J. Botcherby, M. J. Booth, R. Juškaitis, and T. Wilson, "Agitation-free multiphoton microscopy of oblique planes," Opt. Lett. 36(5), 663-665 (2011).

C. W. Smith, E. J. Botcherby, and T. Wilson, "Resolution of oblique-plane images in sectioning microscopy," Opt. Express 19(3), 2662-2669 (2011).

W. Göbel and F. Helmchen, "New angles on neuronal dendrites in vivo," J. Neurophysiol. 98(6), 3770-3779 (2007).

C. Dunsby, "Optically sectioned imaging by oblique plane microscopy," Opt. Express 16(25), 20306-20316 (2008).

S. Kumar, D. Wilding, M. B. Sikkel, A. R. Lyon, K. T. MacLeod, and C. Dunsby, "High-speed 2D and 3D fluorescence microscopy of cardiac myocytes," Opt. Express 19(15), 13839-13847 (2011).

F. Cutrale and E. Gratton, "Inclined selective plane illumination microscopy adaptor for conventional microscopes," Microsc. Res. Tech. 75(11), 1461-1466 (2012).

E. J. Botcherby, R. Juskaitis, M. J. Booth, and T. Wilson, "Aberration-free optical refocusing in high numerical aperture microscopy," Opt. Lett. 32(14), 2007-2009 (2007).

E. J. Botcherby, R. Juskaitis, M. J. Booth, and T. Wilson, "An optical technique for remote focusing in microscopy," Opt. Commun. 281(4), 880-887 (2008).

C. J. R. Sheppard and H. J. Matthews, "Imaging in high-aperture optical systems," J. Opt. Soc. Am. A 4(8), 1354-1360 (1987).

O. Chaudhuri, S. H. Parekh, W. A. Lam, and D. A. Fletcher, "Combined atomic force microscopy and side-view optical imaging for mechanical studies of cells", Nat. Methods 6, 383-387 (2009).

J. Huisken, J. Swoger, F. Del Bene, J. Wittbrodt and E.H.K. Stelzer, "Optical Sectioning Deep Inside Live Embryos by Selective Plane Illumination Microscopy", Science 305, 1007-1009 (2004).

Tongcang Li, Sadao Ota, Jeongmin Kim, Zi Jing Wong, Yuan Wang, Xiaobo Yin & Xiang Zhang, "Axial Plane Optical Microscopy," Scientific Reports 4, Article No. 7253, Dec. 1, 2014.

Botcherby, E. J., Booth, M. J., Jus˘kaitis, R. & Wilson, T. "Real-time slit scanning microscopy in the meridional plane." Opt. Lett. 34, 1504-1506 (2009).

Botcherby, E. J. et al. "Aberration-free three-dimensional multiphoton imaging of neuronal activity at kHz rates." PNAS 109, 2919-2924 (2012).

\* cited by examiner

MULTIPLANE OPTICAL MICROSCOPE

RELATED APPLICATIONS

This application claims priority to U.S. Provisional Patent Application No. 61/925,118, filed Jan. 8, 2014, and to U.S. Provisional Patent Application No. 61/944,692, filed Feb. 26, 2014, both of which are herein incorporated by reference.

STATEMENT OF GOVERNMENT SUPPORT

This invention was made with government support under Contract No. DE-AC02-05CH11231 awarded by the U.S. Department of Energy. The government has certain rights in this invention.

TECHNICAL FIELD

This disclosure relates generally to microscopy and more particularly to optical microscopy.

BACKGROUND

A conventional wide-field optical microscope can capture two-dimensional (2D) images of cross-sections of a sample within the thin focal plane of the objective lens normal to its optical axis. For applications such as imaging cortical neurons of a living brain or studying mechanotransduction and mechanical properties of cells, however, the principle plane of interest is often perpendicular to the cross-sections of the sample captured with the objective lens. Currently, axial plane images (e.g., images of planes parallel to the optical axis of the objective lens) are typically obtained with a confocal microscope by scanning its objective lens, intrinsically limiting temporal resolution. In principle, axial plane images can also be obtained by digital holographic microscopy, but digital holographic microscopy requires coherent light signals and is thus not applicable to incoherent fluorescence signals, critically limiting its applications in biology.

SUMMARY

In some embodiments, an axial plane optical microscope (APOM) can directly image a cross-section of a sample parallel to the optical axis of an objective lens, without scanning. This is in contrast to conventional microscopes that require scanning to acquire axial cross-section images. Combined with conventional microscopy, an APOM can simultaneously provide two orthogonal images of a three-dimensional (3D) sample. In some embodiments, an APOM uses a single objective lens near the sample to achieve selective-plane illumination microscopy, which has been demonstrated by 3D imaging of fluorescent pollens and brain slices. In some embodiments, APOM techniques may allow for fast, high-contrast, and convenient imaging of large biological tissues and single fluorescent molecules. In some embodiments, a multiplane optical microscope can directly image a specified cross-section of a sample, without scanning.

One innovative aspect of the subject matter described in this disclosure can be implemented in an apparatus including a sample holder, a first objective lens, a plurality of optical components, a second objective lens, and a mirror. The sample holder is configured to hold a sample, the sample including a lateral plane and a specified plane with a first angle of about 0 degrees to 90 degrees between the lateral plane and the specified plane. The first objective lens is positioned proximate the sample holder and has a first optical axis. The first objective lens is configured to generate a primary image of the sample, the primary image including a first image and a second image, the first image being an image of the lateral plane of the sample, the second image being an image of the specified plane of the sample. The plurality of optical components is configured to project the primary image from the first objective lens on a first image plane to form the first image. The second objective lens has a second optical axis. The mirror is positioned at a focus of the second objective lens and at an angle of one half of the first angle with respect to a plane perpendicular to the second optical axis. The plurality of optical components is further configured to project the primary image through the second objective lens. The mirror is configured to reflect a reflected image in which the second image is converted to be substantially perpendicular to the second optical axis. The plurality of optical components is further configured to project the reflected image from the second objective lens on a second image plane to form the second image.

In some embodiments, the first optical axis is substantially perpendicular to the lateral plane of the sample.

In some embodiments, the apparatus further comprises a first detector positioned at the first image plane, with the first detector configured to record the first image, and a second detector positioned at the second image plane, with the second detector configured to record the second image. In some embodiments, the first detector comprises a first charge coupled device and the second detector comprises a second charge coupled device.

In some embodiments, the first angle between the lateral plane and the specified plane is 90 degrees, and the angle of one half of the first angle with respect to the plane perpendicular to the second optical axis is 45 degrees.

In some embodiments, the mirror comprises a surface of a silicon wafer coated with a layer of metal. In some embodiments, the mirror is configured to be rotated about the second optical axis.

In some embodiments, the apparatus further comprises a light source configured to project light along the first optical axis to illuminate the sample.

In some embodiments, the first objective lens is substantially identical to the second objective lens. In some embodiments, a numerical aperture of the first objective lens and the second objective lens is greater than about 0.7 times the refractive index of a medium in which the first objective lens and the second objective lens are configured to operate. In some embodiments, a numerical aperture of the first objective lens and the second objective lens is greater than about 0.7. In some embodiments, a magnification of the first objective lens and the second objective lens is about 1× magnification to 200× magnification.

In some embodiments, the second objective lens is positioned a distance from the first objective lens. In some embodiments, the second optical axis is substantially parallel to the first optical axis.

In some embodiments, the plurality of optical components includes a first beam splitter and a second beam splitter, where the first beam splitter is positioned at a first angle with respect to the first optical axis, and where the second beam splitter is positioned at a second angle with respect to the second optical axis. The first beam splitter is configured to reflect the primary image from the first objective lens to the second beam splitter, and the second beam splitter is configured to reflect the primary image through the second objective lens.

In some embodiments, the plurality of optical components further includes a first lens and a second lens. A focal point of the first lens overlaps with a back focal point of the first objective lens and receives the primary image from the beam splitter. The focal point of the first lens overlaps with a focal point of the second lens. The second beam splitter receives the primary image from the second lens. In some embodiments, the first lens and the second lens are substantially identical. In some embodiments, the plurality of optical components further includes a third lens and a fourth lens. The second beam splitter is configured to transmit the primary image through the beam splitter to the fourth lens. The fourth lens is configured to focus the first image on the first image plane. The second beam splitter is configured to transmit the reflected image to the third lens. The third lens is configured to focus the second image on the second image plane. In some embodiments, the first lens, the second lens, the third lens, and the fourth lens are substantially identical.

Another innovative aspect of the subject matter described in this disclosure can be implemented in an apparatus including a sample holder, a first objective lens, a plurality of optical components, a second objective lens, and a mirror. The sample holder is configured to hold a sample, the sample including a lateral plane and an axial plane with an angle of about 90 degrees between the lateral plane and the axial plane. The first objective lens is positioned proximate the sample holder. The first objective lens has a first optical axis. The first objective lens is configured to generate a primary image of the sample, the primary image including a first image and a second image, the first image being an image of the lateral plane of the sample, and the second image being an image of the axial plane of the sample. The plurality of optical components is configured to project the primary image from the first objective lens on a first image plane to form the first image. The second objective lens has a second optical axis. The mirror is positioned at a focus of the second objective lens and at about 45 degrees with respect a plane perpendicular to the second optical axis. The plurality of optical components is further configured to project the primary image through the second objective lens. The mirror is configured to reflect a reflected image in which an image substantially parallel to the second optical axis of the second objective lens is converted to be substantially perpendicular to the second optical axis. The plurality of optical components is further configured to project the reflected image from the second objective lens on a second image plane to form the second image.

In some embodiments, the first optical axis is substantially parallel to the axial plane of the sample, and the first optical axis is substantially perpendicular to the lateral plane of the sample.

In some embodiments, the mirror is configured to convert an image in an axial plane of the second objective lens to an image in a lateral plane of the second objective lens.

Details of one or more embodiments of the subject matter described in this specification are set forth in the accompanying drawings and the description below. Other features, aspects, and advantages will become apparent from the description, the drawings, and the claims. Note that the relative dimensions of the following figures may not be drawn to scale.

DETAILED DESCRIPTION

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise.

Introduction

Optical apparatus that can directly image multiple planes of a sample, without scanning, are described herein. For example, a lateral cross-section and a specified cross-section (e.g., an axial cross-section or an oblique cross-section) of a sample can be imaged simultaneously using a multiplane optical microscope. A lateral cross-section of a sample is plane perpendicular or substantially perpendicular to the optical axis of the objective lens of a microscope. An axial cross-section of a sample is a plane parallel or substantially parallel to the optical axis of the objective lens of a microscope. An oblique cross-section of sample is a plane that is not parallel to the optical axis of the objective lens of a microscope. As another example, a lateral cross-section and an axial cross-section of a sample can be imaged simultaneously using an axial plane optical microscope (APOM). An APOM may be considered to a type of a multiplane optical microscope.

Multiplane optical microscopes may be compatible with conventional wide-field microscopes, enabling fast, simultaneous acquisition of orthogonal combinations of wide-field images (e.g., lateral and axial) or other combinations of wide-field images of 3D samples. Furthermore, a multiplane optical microscope can be implemented with light-sheet illumination and fluorescence signal detection through the same objective lens. A multiplane optical microscope generally does not require special sample preparation, and may enable fast, high-contrast, and convenient 3D imaging of biological tissues, particularly suitable for imaging the structures beneath the surface of large samples, such as living brains.

Apparatus

FIGS. 1-4 are described with reference to axial plane optical microscopy. The concepts described in FIG. 1-4, however, are also applicable to multiplane optical microscopy.

Figure 1:
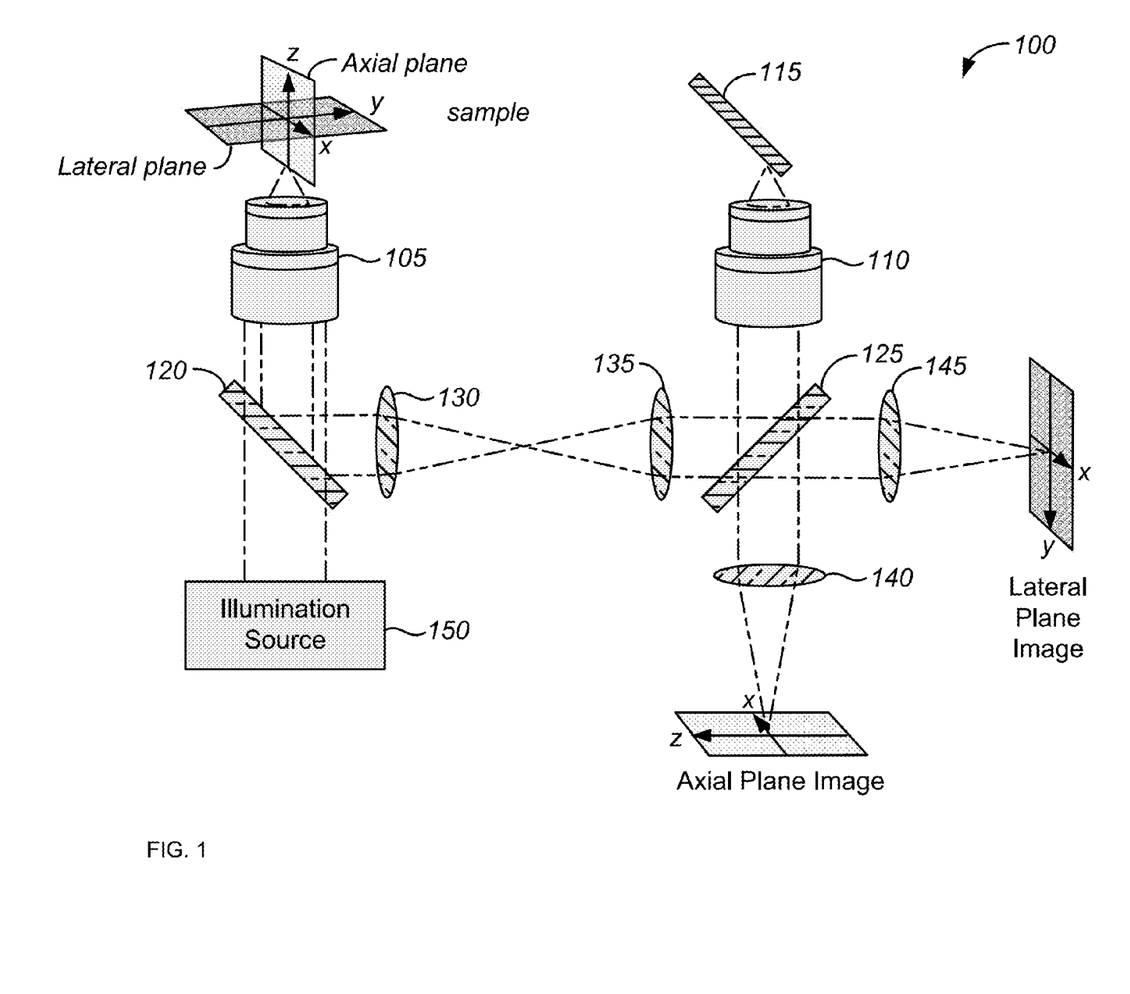
FIG. 1 shows an example of a schematic illustration of an axial plane optical microscope (APOM).

FIG. 1 shows an example of a schematic illustration of an axial plane optical microscope (APOM). As shown in FIG. 1, an APOM 100 includes a first objective lens 105 and a second objective lens 110. The first objective lens 105 is proximate a sample holder (not shown) configured to hold a sample. The second objective lens 110 is proximate a mirror 115. The APOM 100 further includes a first beam splitter 120, a second beam splitter 125, a first lens 130, a second lens 135, a third lens 140, a fourth lens 145, and an illumination source 150. In some embodiments, the lenses 130, 135, 140, and 145 comprise achromatic lenses (e.g., doublet achromatic lenses having a focal length (f) of about 100 millimeters (mm) to 200 mm, or about 150 mm). In some embodiments, the lenses 130, 135, 140, and 145 are identical or substantially identical to each other. With the optical components of the APOM 100, the APOM 100 is able to simultaneously generate both a lateral plane image and an axial plane image of the sample.

In some embodiments, the sample is a three-dimensional (3D) object that includes a lateral plane (e.g., an x-y plane) and an axial plane (e.g., an x-z plane). For example, the sample may be a 3D object, such a thick brain slice. The lateral plane and the axial plane have an angle of 90° or about 90° between the two planes. The lateral plane of the sample is perpendicular or substantially perpendicular to the optical axis of the first objective lens 105. The axial plane of the sample is parallel or substantially parallel to the optical axis of the first objective lens 105. An optical axis may be defined as the imaginary line that defines a path along which light propagates through a lens or a system. The optical axis is also a line along which there is some degree of rotational symmetry in a lens or an optical system. For example, the optical axis of the first objective lens 105 as shown in FIG. 1 passes through the center of curvature of each of its surfaces, and coincides with the axis of rotational symmetry of the objective lens 105. In some embodiments, the optical axis of the first objective lens 105 is parallel to or substantially parallel to an optical axis of the second objective lens 110. The optical axes of the first objective lens 105 and the second objective lens 110 being parallel may aid in the alignment and setup of the APOM 100.

In some embodiments, the illumination source 150 is positioned to transmit light onto the sample. In some embodiments, the illumination source 150 is positioned to transmit light though the first beam splitter 120, through the first objective lens 105, and onto the sample. In some embodiments, the illumination source 150 comprises a tungsten lamp. In some embodiments, the illumination source 150 comprises a mercury lamp (e.g., for imaging fluorescent pollens and mouse brain slices). In some embodiments, the illumination source 150 comprises a laser (e.g., for light-sheet microscopy). In some embodiments, the first beam splitter 120 comprises a 90% reflection beam splitter; that is, the first beam splitter 120 transmits 10% of the light from the illumination source 150 onto the sample, and reflects 90% of the light transmitted onto it from the first objective lens 105. In some embodiments, the first beam splitter 120 comprises an 80% reflection beam splitter.

The first objective lens 105 transmits light reflected from and/or emitted by the sample. This light includes three-dimensional (3D) information of the sample, including both an image of a lateral plane of the sample and an image of an axial plane of the sample. The axial plane image of the sample includes optical signals from points outside of the focal plane of the first objective lens 105 (e.g., points of positive defocus and points of negative defocus). In some embodiments, the light is transmitted onto the first beam splitter 120. In some embodiments, the first beam splitter 120 reflects the light to the first lens 130. In some embodiments, a back focal point of the first objective lens 105 overlaps with a focal point of the first lens 130. One of ordinary skill in the art will recognize that the first objective lens 105, the first beam splitter 120, the first lens 130, and the illumination source 150 form a conventional microscope. For example, a detector placed at the focal point of the first lens 130 may record a lateral plane image of the sample.

In some embodiments, the focal point of first lens 130 overlaps with the focal point of the second lens 135. The first lens 130 focuses the light, which is then transmitted though the second lens 135. In some embodiments, the first lens 130 is identical to or substantially identical to the second lens 135. In some embodiments, the first lens 130 and the second lens 135 allow the first objective lens 105 and the second objective lens 110 to be positioned apart from one another. In some embodiments, the second lens 135 transmits the light to the second beam splitter 125. In some embodiments, the second beam splitter 125 is a 50% reflection beam splitter; that is, the second beam splitter 125 transmits 50% of the light from the second lens 125 and reflects 50% of the light from the second lens 125.

In some embodiments, the light that is transmitted through the second beam splitter 125 is transmitted through the fourth lens 145. The fourth lens 145 focuses the light and generates a lateral plane image of the sample at the focal point of the fourth lens 145. In some embodiments, an eyepiece is positioned after the focal point of the fourth lens 145 to enable a viewer to view the lateral plane image. In some embodiments, a detector is positioned at the focal point of the fourth lens 145 to record the lateral plane image. In some embodiments, the detector comprises a charge coupled device (CCD).

In some embodiments, the light that is reflected by the second beam splitter 125 is transmitted through the second objective lens 110. In some embodiments, the second objective lens 110 transmits the light to the mirror 115. In some embodiments, the mirror 115 is positioned at the focal point of the second objective lens 110.

In some embodiments, the mirror 115 comprises a silicon wafer with a layer of a reflective metal on a surface of the silicon wafer. In some embodiments, the reflective metal comprises aluminum. In some embodiments, the layer of reflective metal comprises an about 50 nanometer (nm) to 200 nm thick layer of aluminum, or an about 150 nm thick layer of aluminum. In some embodiments, the silicon wafer has a cleaved edge that is straight or substantially straight. The cleaved edge of the silicon wafer may be able to be positioned close to the second objective lens 110. The mirror 115 may be positioned close to the second objective lens 110 because a high numerical aperture objective lens generally has a short working distance (e.g., about 0.1 mm to 0.2 mm, or about 0.13 mm). The cleaved edge of the silicon wafer that is straight or substantially straight may aid in positioning the mirror 115 close to the second objective lens 110.

In some embodiments, the mirror 115 is tilted 45° or about 45° with respect to a plane perpendicular to the optical axis of the second objective lens 110. In some embodiments, the light transmitted though the second objective lens 110 generates a three-dimensional image of the sample around the focal point of the second objective lens 110. The three-dimensional image may include no aberrations or substantially no aberrations. The mirror 115 reflects the light that was transmitted by the second objective lens 110. A portion of the light reflected by the mirror 115 is recollected by the second objective lens 110. In some embodiments, the portion of the light reflected by the mirror 115 and recollected by the second objective lens 110 can form an axial plane image of the sample. This light may be then be transmitted through the second beam splitter 125 and focused by the third lens 140.

That is, in some embodiments, the mirror 115 converts an image in the axial plane of second objective lens 110 to an image in the lateral plane of the second objective lens 110. The axial plane image of the sample may then be formed at an image plane of the second objective lens 110. The third lens 140 focuses the light to generate an axial plane image at the focal point of the third lens 140. In some embodiments, an eyepiece is positioned after the focal point of the third lens 140 to enable a viewer to view the axial plane image. In some embodiments, a detector is positioned at the focal point of the third lens 140 to record the axial plane image. In some embodiments, the detector comprises a CCD.

In some embodiments, the first objective lens 105 is identical to or substantially identical to the second objective lens 110. In some embodiments, a focal length (f) of the first objective lens 105 and the second objective lens 110 is about 0.8 mm to 5 mm, or about 1.6 mm. In some embodiments, a magnification of the first objective lens 105 and the second objective lens 110 is about 1× magnification to 200× magnification, or about 20× magnification to 200× magnification. In some embodiments, a numerical aperture (NA) of the first objective lens 105 and the second objective lens 110 is greater than about 0.7 times the refractive index of the medium though in which the lenses are operating. For example, the refractive index is 1.00 for air, 1.33 for pure water, and about 1.5 for immersion oil. In some embodiments, a numerical aperture (NA) of the first objective lens 105 and the second objective lens 110 is greater than about 0.7 or greater than about 0.8. The numerical aperture of an objective lens characterizes the range of angles over which the objective lens can accept or emit light. For example, the first objective lens 105 and the second objective lens 110 may each comprise a 100× magnification oil immersion lens having a numerical aperture of 1.4.

Figure 2:
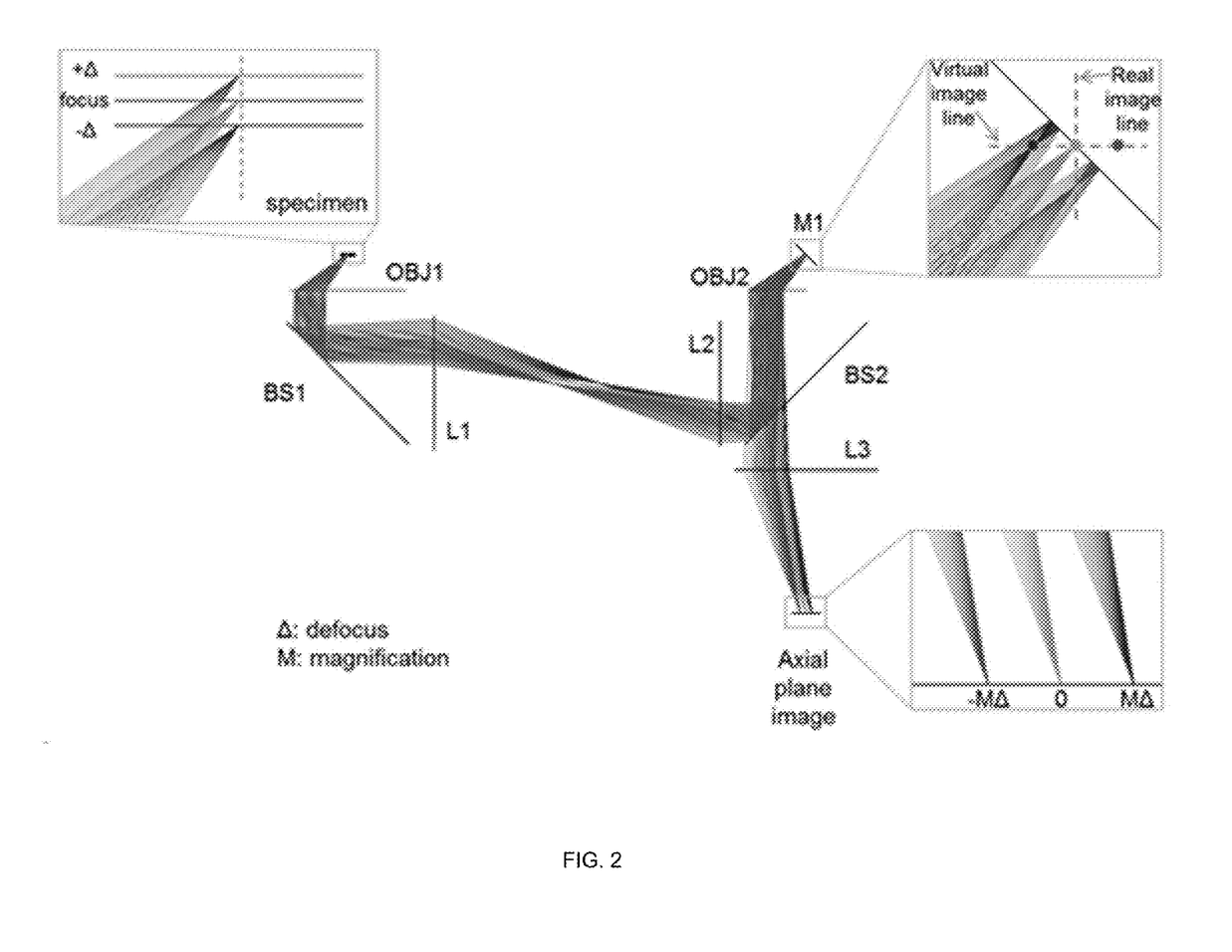
FIG. 2 shows an example of a ray tracing simulation of the APOM shown in FIG. 1.

FIG. 2 shows an example of a ray tracing simulation of the APOM shown in FIG. 1. Note that the APOM shown in FIG. 2 does not include the fourth lens 145 that is used to form the lateral plane image. As shown in FIG. 2, three object points placed on the optical axis of the first objective lens (OBJ1) in the specimen are imaged to a detector (i.e., positioned at the "Axial plane image" in FIG. 2). The first objective lens (OBJ1) and the second objective lens (OBJ2) are identical objective lenses. The mirror (M1) is a mirror tilted by 45° with respect to a plane perpendicular to the optical axis of the second objective lens (OBJ2). Also shown are the first beam splitter (BS1), the second beam splitter (BS2) and the lenses (L1, L2, and L3). The lenses all have the same focal length. The separation between the object points ($\Delta$) is magnified by a factor M, which is the ratio of the focal length of lens 3 (L3) over the focal length of the first objective lens (OBJ1). In the simulation, all optical components were assumed to be aberration free. The back focal point of the first objective lens (OBJ1) overlaps with the focal point of lens 1 (L1); the focal point of lens 1 (L1) overlaps with the focal point of lens 2 (L2). The focal points of lens 2 (L2) and lens 3 (L3) overlap with the back focal point of second objective lens (OBJ2). As shown in the insets, the mirror converts the image in the axial plane of second objective lens (OBJ2) to an image in the lateral plane of second objective lens (OBJ2).

Figure 3:
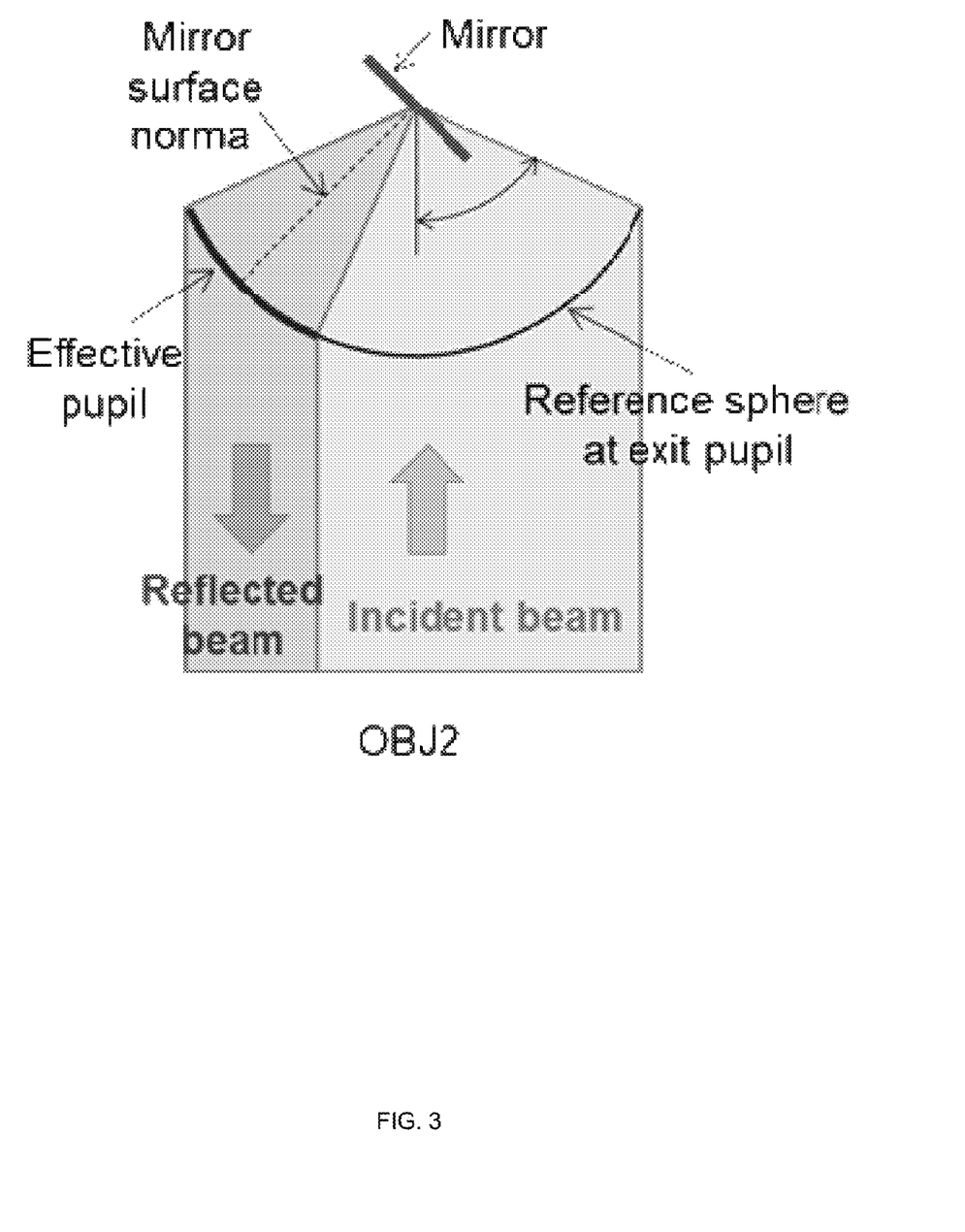
FIG. 3 shows an example of a schematic illustration of the effective pupil of the second objective lens of the APOM shown in FIG. 1.

FIG. 3 shows an example of a schematic illustration of the effective pupil of the second objective lens of the APOM shown in FIG. 1. An exit pupil of the second objective lens, as shown in FIG. 3, is a virtual aperture of the lens. Rays that pass through this virtual aperture can exit the second objective lens. The effective pupil of the second objective lens is due to signal loss at the mirror.

Figure 4:
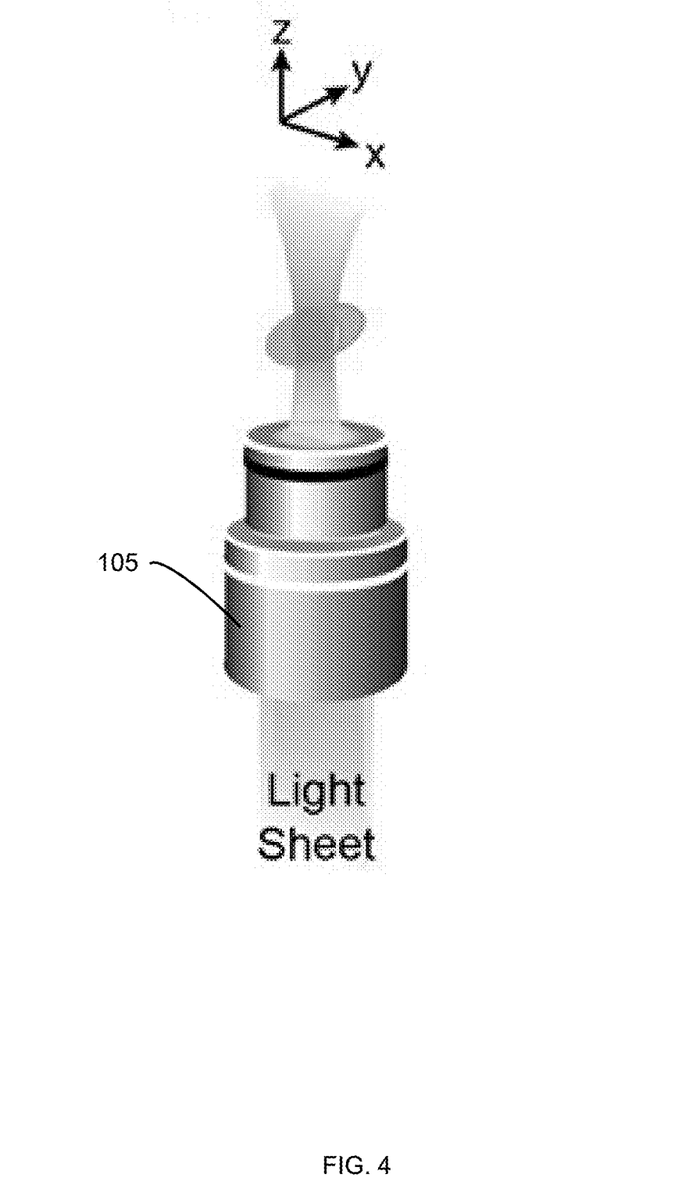
FIG. 4 shows an example of a schematic illustration of a light sheet that may be used with the APOM shown in FIG. 1.

FIG. 4 shows an example of a schematic illustration of a light sheet that may be used with the APOM shown in FIG. 1. As shown in FIG. 4, a light sheet may be transmitted through the first objective lens 105. In some embodiments, the light sheet is a laser light sheet. A light sheet may be used instead of using a more conventional illumination source, such as a tungsten lamp or a mercury lamp, for example. In some embodiments, a light sheet is used to capture axial plane images of biological samples with high contrast. In some embodiments, a light sheet may be generated by passing a laser beam (e.g., having a wavelength of 532 nm) through a pair of cylindrical lenses (e.g., f=15 mm and f=200 mm). In some embodiments, a thin slot is used to further reduce the thickness of the light sheet. In some embodiments, the light sheet has a thickness of about 2 microns near the focal point of the first objective lens for selective plane illumination. Because an APOM uses one objective near the sample, axial plane optical microscopy may not need special sample preparation as in selective plane imaging microscopy (SPIM) and may be particularly suitable for imaging the structures along a depth beneath the surface of large samples, such as the cerebral cortex of living mammal brains, for example.

Alterations to the APOM described herein are possible. One of ordinary skill the art will recognize that different arrangements of the first beam splitter 120, the second beam splitter 125, the first lens 130, the second lens 135, the third lens 140, the fourth lens 145, and the illumination source 150 of the APOM 100 shown FIG. 1 are possible. Also, some of the optical components of the APOM 100 may be replaced with alternative optical components. For example, in some embodiments, the illumination source of an APOM is positioned to transmit light though the sample that is then transmitted through the first objective lens. When the light source is positioned in this manner, the first beam splitter may be replaced with a mirror. Further, in some embodiments of an APOM, additional optical components may be added to the APOM 100 or optical components may be omitted from the APOM 100, depending on the configuration of the APOM.

In some embodiments, the resolution of an APOM may be increased by using objective lenses with larger numerical apertures (NA). For example, objective lenses with 1.49 NA are commercially available and can improve the axial resolution of an APOM (e.g., to about 450 nm for a wavelength of 546 nm). In some embodiments, the field of view of an APOM may be increased. For example, the field of view of an APOM can be increased to about 200 microns by 200 microns, without decreasing the resolution, by using commercially available 40× magnification, 1.4 NA objective lenses. In some embodiments, the field of view may be further improved by phase correction with spatial light modulation.

In some embodiments, the mirror can be rotated about the optical axis of the second objective lens 110 (i.e., a second optical axis). Rotating the mirror about the second optical axis does not change an angle that the mirror forms with a plane that is perpendicular to the second optical axis. Rotating the mirror about the optical axis of the second objective lens may permit imaging of different axial planes of the sample.

In some embodiments, the mirror can be positioned at an angle with respect to a plane perpendicular to the second optical axis of about 0 degrees to 45 degrees. Positioning the mirror at different angles with respect to a plane perpendicular the second optical axis may permit imaging of a specified plane of the sample. For example, an oblique plane (i.e., a plane that is not parallel to the optical axis of the first objective lens or a plane that is not perpendicular with respect to the lateral plane of the sample) may be imaged. In this case, tilting the mirror 115 can transform an oblique plane to the focal plane of the second objective lens 110, which then may be imaged. When the mirror is tilted 45 degrees with respect to the plane perpendicular to the optical axis of the second objective lens, the microscope forms an axial plane image using the second objective lens. When the mirror is tilted about 0 degrees to 45 degrees with respect to the plane perpendicular to the optical axis of the second objective lens, the microscope forms an oblique plane image using the second objective lens. A multiplane optical microscope is described below with reference to FIG. 5.

In some embodiments, the second beam splitter is a polarizing beam splitter. In some embodiments, when the second beam splitter is a polarizing beam splitter, a quarter waveplate is positioned between the second beam splitter and the second objective lens. A waveplate is an optical device that alters the polarization state of a light wave transmitted through it.

With such a configuration, light transmitted from the second lens to the second beam splitter that is p-polarized may be transmitted through the beam splitter and the fourth lens. The fourth lens focuses the p-polarized light and generates a lateral plane image of the sample at the focal point of the fourth lens. Light transmitted from the second lens to the second beam splitter that is s-polarized may be reflected from the second beam splitter and be transmitted through the quarter waveplate. After the light is transmitted through the second objective lens, reflected from the mirror, and transmitted back through the second objective lens, it would be transmitted though the quarter waveplate again, at which point the light would be p-polarized. The p-polarized light may be transmitted through the second beam splitter and the third lens. The third lens focuses the p-polarized light and generates an axial plane image of the sample at the focal point of the third lens. In some embodiments, using a polarizing beam splitter and a quarter waveplate may aid in preventing light from being reflected from the second beam splitter back through the second lens.

In some embodiments, an assembly including a second objective lens, a mirror, and a plurality of optical components may be associated with a conventional optical microscope. For example, a microscopy apparatus may include a conventional optical microscope and the assembly including the second objective lens, the mirror, and the plurality of optical components attached to or otherwise integrated with the conventional optical microscope. The conventional optical microscope may be used to image the lateral plane of the sample, and the assembly may be used to image the axial plane of the sample.

In some embodiments, the sample stage comprises a translational sample stage. With a translational sample stage, a sample may be able to be translated (e.g., in one dimension) across the focus of the first objective lens. With charge coupled devices capturing images of the sample as it is translated across the focus of the first objective lens, a three-dimensional image of the sample may be generated. In some embodiments, a translational sample stage is used with a light sheet illumination source.

Figure 5:
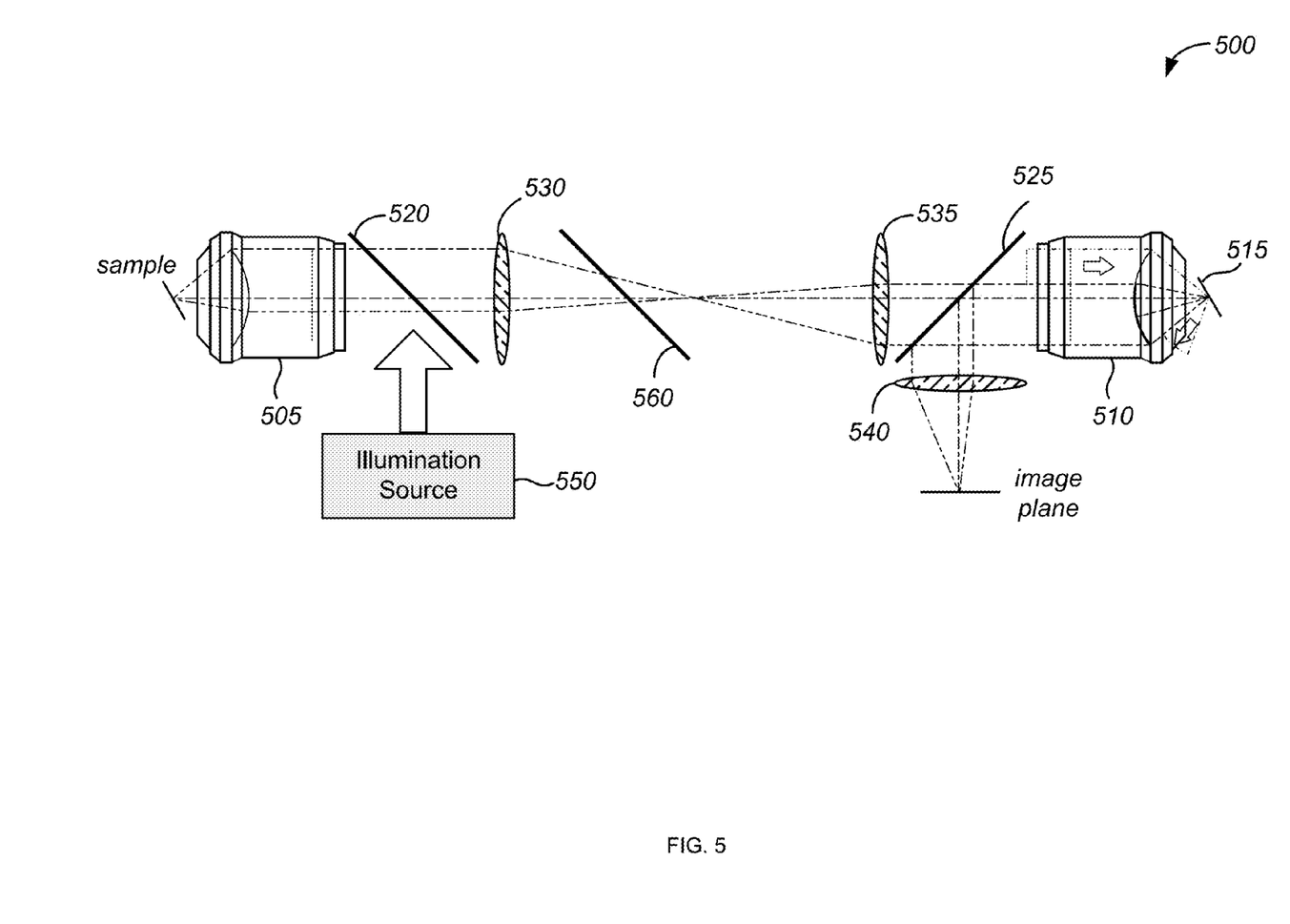
FIG. 5 shows an example of a schematic illustration of a multiplane optical microscope.

FIG. 5 shows an example of a schematic illustration of a multiplane optical microscope. The multiplane optical microscope 500 shown in FIG. 5 is an example of a microscope in which the mirror can be tilted at a specified angle (e.g., not necessarily 45° or about 45°) with respect to a plane perpendicular to the optical axis of the second objective lens. For example, in some embodiments, the mirror may be tilted 0 degrees (i.e., perpendicular) to 45 degrees with respect a plane perpendicular to the optical axis of the second objective lens. When the mirror is tilted 45 degrees with respect the plane perpendicular to the optical axis of the second objective lens, an axial plane image is formed. When the mirror is parallel to the plane perpendicular to the optical axis of the second objective lens, a lateral plane image is formed. The multiplane optical microscope 500 also allows for imaging of an oblique plane (i.e., not an axial plane) of a sample or an axial plane of a sample by adjusting the angle of the mirror with respect to the plane perpendicular to the optical axis of the second objective lens.

As shown in FIG. 5, the multiplane optical microscope 500 includes a first objective lens 505 and a second objective lens 510. The first objective lens 505 is proximate a sample holder (not shown) configured to hold a sample. The second objective lens 510 is proximate a mirror 515. The angle of the mirror 515 with respect to a plane perpendicular to the optical axis of the second objective lens 510 can be adjusted. The multiplane optical microscope 500 further includes a first beam splitter 520, a second beam splitter 525, a first lens 530, a second lens 535, a third lens 540, an illumination source 550, and a third beam splitter 560. In some embodiments, the lenses 530, 535, and 540 are identical or substantially identical to each other.

In some embodiments, the third beam splitter 560 allows some light to pass between the first lens 530 and the second lens 535, while also directing some light onto an image plane (not shown) where a lateral plane image is formed. In some embodiments, an eyepiece or a detector is positioned at a point where the lateral plane image is formed.

In some embodiments, the mirror 515 converts an image in a specified plane of second objective lens 510 to an image in the lateral plane of the second objective lens 510. The image of the specified plane of the sample may then be formed at an image plane of the second objective lens 510. The third lens 540 focuses the light to generate an image of the specified plane of the sample at the focal point of the third lens 540. In some embodiments, an eyepiece is positioned after the focal point of the third lens 540 to enable a viewer to view the image of the specified plane. In some embodiments, a detector is positioned at the focal point of the third lens 540 to record the image of the specified plane.

For example, suppose a microscopist using the multiplane optical microscope 500 wishes to image a specified plane in a sample, the specified plane making a first angle between the specified plane and the lateral plane of the sample. The mirror would be positioned at an angle of one half of the first angle with respect to a plane perpendicular to the second optical axis.

For example, when the specified plane of the sample is an axial plane, the first angle between the axial plane and the lateral plane of the sample is 90 degrees. To image the axial plane, the mirror would be positioned at the angle of one half of the first angle, or 45 degrees, with respect to a plane perpendicular to the second optical axis. As another example, the specified plane of the sample may be a plane that makes a first angle of 60 degrees with the lateral plane of the sample. To image the specified plane, the mirror would be positioned at the angle of one half of the first angle, or 30 degrees, with respect to a plane perpendicular to the second optical axis.

Figure 6A:
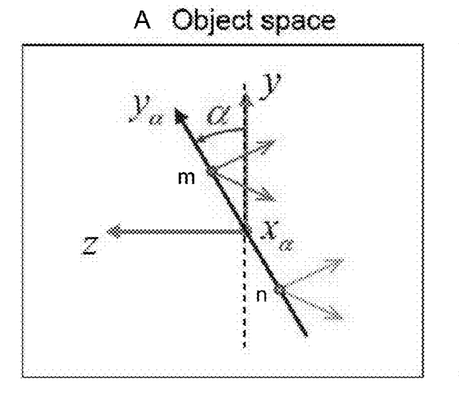
FIGS. 6A-6C show examples of the imaging at the first objective lens, the second objective lens, and the image plane of the multiplane optical microscope shown in FIG. 5.
Figure 6B:
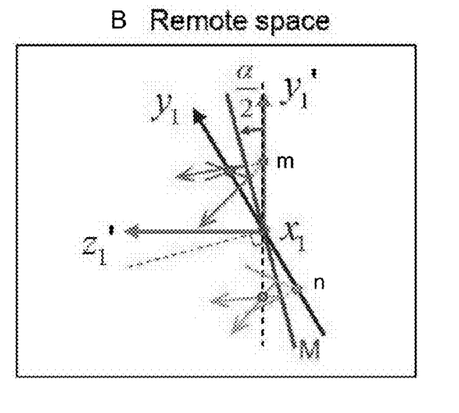
Figure 6C:
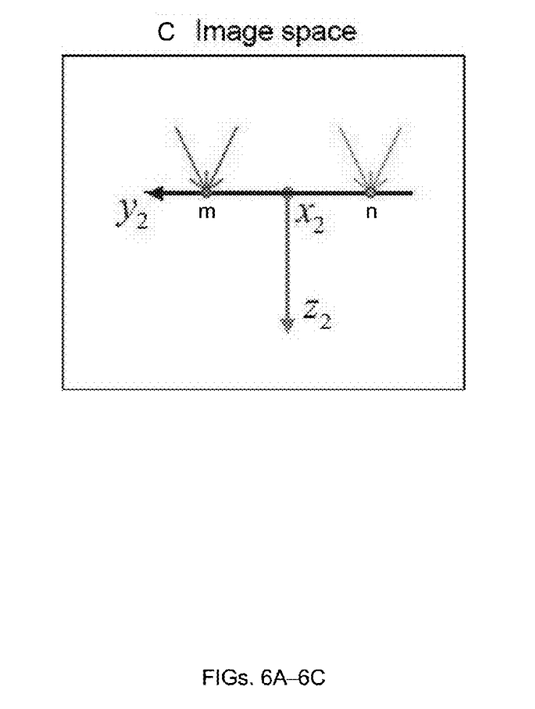

FIGS. 6A-6C show examples of the imaging at the first objective lens 505 (FIG. 6A, object space), the second objective lens 510 (FIG. 6B, remote space), and the image plane (FIG. 6C, image space) of the multiplane optical microscope 500 shown in FIG. 5. For example, suppose a microscopist wishes to image an $x_\alpha y_\alpha$ plane of the sample that forms an angle $\alpha$ with the lateral plane of the object space (i.e., the sample; see FIG. 6A). The mirror M would be positioned at an angle $\alpha/2$ with respect to the plane perpendicular to the optical axis of the second objective lens 510 in the remote space (FIG. 6B).

FIG. 6A-6C show that the $\alpha$-tilted plane ($x_\alpha y_\alpha$) in the object space is optically conjugate with the detector plane in the image space due to the $\alpha/2$-tilted mirror in the remote space. FIG. 6A shows coordinates in the object space—a specified plane ($x_\alpha y_\alpha$) inclined by $\alpha$ with respect to the focal plane or lateral plane (xy) of the objective lens 505. FIG. 6B shows coordinates in remote space—the $x_1 y_1$ image plane conjugate with the $x_\alpha y_\alpha$ plane is rotated back to the $x_1' y_1'$ plane (the focal plane or lateral plane of the second objective lens 510) by the $\alpha/2$-tilted mirror M. FIG. 6C shows coordinates in image space—the image plane ($x_2 y_2$) is conjugate with the $x_\alpha y_\alpha$ object plane. Rays from two points (m and n) on the specified $x_\alpha y_\alpha$ plane are focused on the $x_2 y_2$ plane.

In the multiplane optical microscope 500 shown in FIG. 5, the first objective lens 505 and the second objective lens 510 are relayed back-to-back by the first lens 530 and the second lens 535. In some embodiments, this configuration of objective lenses and lenses can compensate for aberrated optical wave fronts from the out-of-focus object near focal regions by the odd parity condition, thereby extending the depth of field.

In some embodiments, the NA or half-cone angle of the second objective lens 510 is specified so that it is greater than the mirror tilt angle (i.e., the tilt angle with respect the plane perpendicular to the optical axis of the second objective lens 510) to prevent a complete loss of light from detection. For example, in axial plane imaging (i.e., with the mirror tilt angle being 45° with respect to a plane perpendicular to the second optical axis), the NA of the second objective lens 510 may be greater than 0.71 in air medium. Generally, the use of as high NA as possible may reduce or minimize clipping of the signal light.

Figure 7:
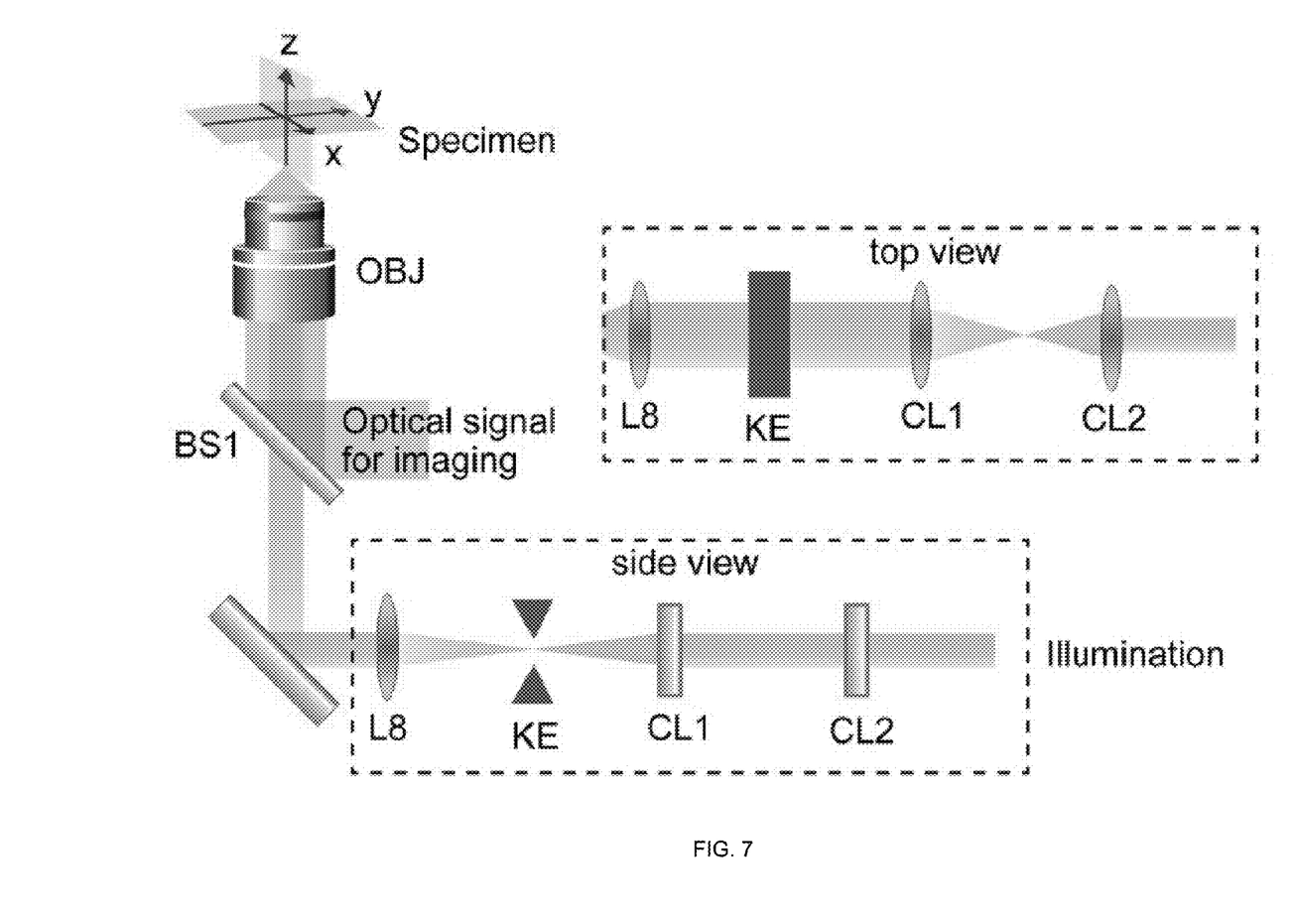
FIG. 7 shown an example of a schematic illustration of an optical arrangement configured to generate a light sheet with a tunable thickness for illumination of a sample.

FIG. 7 shown an example of a schematic illustration of an optical arrangement configured to generate a light sheet with a tunable thickness for illumination of a sample. A conventional circular (or almost circular) illumination laser beam can be converted to a light sheet by a pair of cylindrical lenses (CL1 and CL2). In some embodiments, the generated light sheet at the focus between a lens L8 and cylindrical lens CL1 has a thickness of about 0.25 millimeters (mm) to 0.75 mm, or about 0.5 millimeters, and a width of about 5 mm to 15 mm, or about 10 mm. In some embodiments, the lens L8 and the first objective lens OBJ demagnify this light sheet to a smaller light sheet at the focus of the first objective lens OBJ. In some embodiments, two knife edges KE or a slit (e.g., a variable mechanical slit) are placed at the focus between lens L8 and cylindrical lens CL1. The thickness of the light sheet can be tuned by changing the gap between the two knife edges KE or by changing the width of the slit.

Figure 8:
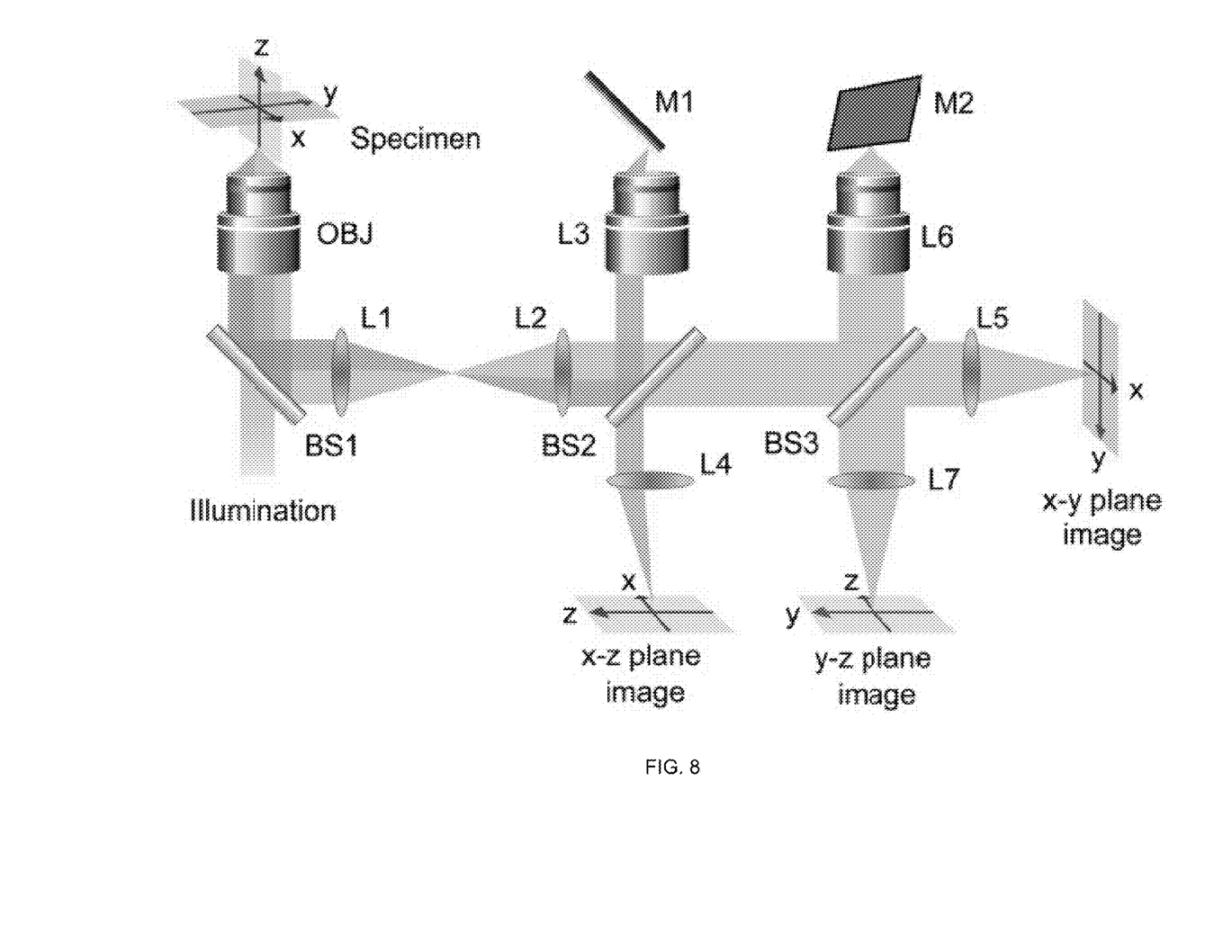
FIG. 8 shows an example of a schematic illustration of a multiplane optical microscope configured to image three cross-sections that are perpendicular to each other, simultaneously.

FIG. 8 shows an example of a schematic illustration of a multiplane optical microscope configured to image three cross-sections of a sample that are perpendicular to each other, simultaneously. For example, an x-y plane (i.e., a lateral plane), an x-z plane (i.e., a first axial plane), and a y-z plane (i.e., a second axial plane) of a sample can be imaged simultaneously. In some embodiments, the bottom edge of a tilted mirror M1 is parallel to an x-axis. In some embodiments, the bottom edge of a tilted mirror M2 is parallel to a y-axis. In some embodiments, the tilted mirror M1 or/and M2 may be rotated around the optical axis of an objective lens L3 or/and an objective lens L6.

CONCLUSION

In some embodiments, an axial plane optical microscope (APOM) is capable of directly imaging the axial plane cross-sections of various 3D samples, with no scanning. The acquired images may show negligible distortion over a large field of view (e.g., greater than about 70 microns by 70 microns), which is much larger than the depth of focus in conventional optical microscopy. When a laser sheet is used for illumination through a single objective lens near the sample, an APOM can provide fast, high-contrast, and convenient 3D images of thick biological samples, such as pollens and brain slices, for example. An APOM with light-sheet illumination opens a new avenue for many biological applications, such as direct imaging of a living brain from its surface or potentially inside by endoscopes, for example. Moreover, the light sheet from the single high NA objective lens can be thinned down further to reduce the excitation volume and consequently increase the signal-to-background ratio, which may enable fast and convenient imaging of single fluorescent molecules.

Further details regarding multiplane optical microscopy can be found in J. Kim, T. Li, Y. Wang, and X. Zhang, "Vectorial point spread function and optical transfer function in oblique plane imaging," Optics Express 22 (9), 11140-11151, in T. Li, S. Ota, J. Kim, Z. J. Wong, Y. Wang, X. Yin, and X. Zhang, "Wide-field axial plane optical microscopy," Frontiers in Optics 2014, OSA Technical Digest (online) (Optical Society of America, 2014), and in T. Li, S. Ota, J. Kim, Z. J. Wong, Y. Wang, X. Yin, and X. Zhang, "Axial Plane Optical Microscopy," Scientific Reports, 4, 7253 (2014), all of which are herein incorporated by reference.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

What is claimed is:

1. An apparatus comprising:
 a sample holder configured to hold a sample, the sample including a lateral plane and a specified plane with a first angle of about 0 degrees to 90 degrees between the lateral plane and the specified plane;
 a first objective lens positioned proximate the sample holder, the first objective lens having a first optical axis, the first optical axis being substantially perpendicular to the lateral plane of the sample, the first objective lens configured to generate a primary image of the sample, the primary image including information for forming an image of the lateral plane of the sample and a second image, the second image being an image of the specified plane of the sample;
 a plurality of optical components configured to project the primary image from the first objective lens on a first image plane to form the image of the lateral plane of the sample;
 a second objective lens, the second objective lens having a second optical axis; and
 a mirror, the mirror being positioned at a focus of the second objective lens and at an angle of one half of the first angle with respect to a plane perpendicular to the second optical axis, the plurality of optical components being further configured to project the primary image through the second objective lens, the mirror configured to reflect a reflected image of the primary image in which the information for forming the second image is rotated to be substantially perpendicular to the second optical axis, and the plurality of optical components being further configured to project the reflected image from the second objective lens on a second image plane to form the second image.

2. The apparatus of claim 1, further comprising:
 a first detector positioned at the first image plane, wherein the first detector is configured to record the image of the lateral plane of the sample; and
 a second detector positioned at the second image plane, wherein the second detector is configured to record the second image.

3. The apparatus of claim 2, wherein the first detector comprises a first charge coupled device, and wherein the second detector comprises a second charge coupled device.

4. The apparatus of claim 1, wherein the first angle between the lateral plane and the specified plane is 90 degrees, and wherein the angle of one half of the first angle with respect to the plane perpendicular to the second optical axis is 45 degrees.

5. The apparatus of claim 1, wherein the mirror comprises a surface of a silicon wafer coated with a layer of metal.

6. The apparatus of claim 1, wherein the mirror is configured to be rotated about the second optical axis.

7. The apparatus of claim 1, further comprising:
 a light source configured to project light along the first optical axis to illuminate the sample.

8. The apparatus of claim 1, wherein the first objective lens is substantially identical to the second objective lens.

9. The apparatus of claim 1, wherein a numerical aperture of the first objective lens and the second objective lens is greater than about 0.7 times the refractive index of a medium in which the first objective lens and the second objective lens are configured to operate.

10. The apparatus of claim 1, wherein a numerical aperture of the first objective lens and the second objective lens is greater than about 0.7.

11. The apparatus of claim 1, wherein a magnification of the first objective lens and the second objective lens is about 1× magnification to 200× magnification.

12. The apparatus of claim 1, wherein the second objective lens is positioned a distance from the first objective lens.

13. The apparatus of claim 1, wherein the second optical axis is substantially parallel to the first optical axis.

14. The apparatus of claim 13, wherein the plurality of optical components includes a first beam splitter and a second beam splitter, wherein the first beam splitter is positioned at a first angle with respect to the first optical axis, wherein the second beam splitter is positioned at a second angle with respect to the second optical axis, wherein the first beam splitter is configured to reflect the primary image from the first objective lens to the second beam splitter, and wherein the second beam splitter is configured to reflect the primary image through the second objective lens.

15. The apparatus of claim 14, wherein the plurality of optical components further includes a first lens and a second lens, wherein a focal point of the first lens overlaps with a back focal point of the first objective lens and receives the primary image from the beam splitter, wherein the focal point of the first lens overlaps with a focal point of the second lens, and wherein the second beam splitter receives the primary image from the second lens.

16. The apparatus of claim 15, wherein the first lens and the second lens are substantially identical.

17. The apparatus of claim 15, wherein the plurality of optical components further includes a third lens and a fourth lens, wherein the second beam splitter is configured to transmit the primary image through the beam splitter to the fourth lens, wherein the fourth lens is configured to focus the image of the lateral plane of the sample on the first image plane, wherein the second beam splitter is configured to transmit the reflected image to the third lens, and wherein the third lens is configured to focus the second image on the second image plane.

18. The apparatus of claim 17, wherein the first lens, the second lens, the third lens, and the fourth lens are substantially identical.

19. An apparatus comprising:
 a sample holder configured to hold a sample, the sample including a lateral plane and an axial plane with an angle of about 90 degrees between the lateral plane and the axial plane;
 a first objective lens positioned proximate the sample holder, the first objective lens having a first optical axis, the first optical axis being substantially perpendicular to the lateral plane of the sample, the first objective lens configured to generate a primary image of the sample, the primary image including information for forming an image of the lateral plane of the sample and an image of the axial plane of the sample;
 a plurality of optical components configured to project the primary image from the first objective lens on a first image plane to form the image of the lateral plane of the sample;
 a second objective lens, the second objective lens having a second optical axis; and
 a mirror, the mirror being positioned at a focus of the second objective lens and at a 45 degree angle with respect to a plane perpendicular to the second optical axis, the plurality of optical components being further configured to project the primary image through the second objective lens, the mirror configured to reflect a reflected image of the primary image in which the information for forming the image of the axial plane of the sample is rotated to be substantially perpendicular to the second optical axis, and the plurality of optical components being further configured to project the reflected image from the second objective lens on a second image plane to form the image of the axial plane of the sample.

20. The apparatus of claim 19, wherein the mirror comprises a surface of a silicon wafer coated with a layer of metal.

* * * * *